United States Patent [19]

Franzen et al.

[11] 4,353,718

[45] Oct. 12, 1982

[54] ELECTRIC PRECIPITATOR

[75] Inventors: Rudolf Franzen; Peter Klingberg, both of Cologne; Michael Zeug, Lohmar, all of Fed. Rep. of Germany

[73] Assignee: Buckau-Walther AG, Grevenbroich, Fed. Rep. of Germany

[21] Appl. No.: 323,909

[22] Filed: Nov. 23, 1981

[30] Foreign Application Priority Data

Nov. 22, 1980 [DE] Fed. Rep. of Germany ....... 3044053

[51] Int. Cl.$^3$ .............................................. B03C 3/76
[52] U.S. Cl. ..................................... 55/112; 174/177; 464/900; 464/154
[58] Field of Search ........................... 55/112, 12, 300; 64/9 R, 14; 174/138 D, 177, 186

[56] References Cited

U.S. PATENT DOCUMENTS

| 777,215 | 12/1904 | Meston | 174/138 D |
|---|---|---|---|
| 2,136,947 | 11/1938 | Morgan | 64/9 R |
| 2,699,656 | 1/1955 | Anderson et al. | 64/9 R |
| 3,570,217 | 3/1971 | Steurnagel | 55/300 |
| 3,972,701 | 8/1976 | Teel | 55/146 |
| 4,263,022 | 4/1981 | Brandt et al. | 55/112 |

FOREIGN PATENT DOCUMENTS 262339 1/1964 Australia ............................... 55/112

Primary Examiner—Bernard Nozick
Attorney, Agent, or Firm—Michael J. Striker

[57] ABSTRACT

An electric precipitator has a plurality of electrodes arranged in a housing, and a knocking device for cleaning the electrodes and including a plurality of anvils connected with the electrodes, a plurality of hammers arranged on a rotary knocking shaft, a drive unit with a driving shaft, and an insulating coupling for transmitting rotation of the driving shaft to the knocking shaft, wherein the insulating coupling includes engaging members mounted on the shaft, an intermediate coupling member, and drive bushes connecting the intermediate member with the engaging members so that each drive bush has a polygonal receiving opening with rounded corners and concave connecting lines, and each engaging member has a shape corresponding to the shape of the receiving opening with a small play and engages in the receiving opening.

8 Claims, 3 Drawing Figures

ELECTRIC PRECIPITATOR

BACKGROUND OF THE INVENTION

The present invention relates to an electric precipitator provided with a knocking device.

Electric precipitators of the above mentioned general type are known in the art. A known electric precipitator has a housing and a plurality of collecting electrodes and spark (corona-discharge) electrodes located therebetween. The knocking arrangement of such a precipitator includes a rotary knocking shaft with a plurality of small hammers, and a plurality of anvils arranged on holding elements of collecting and/or spark electrodes so that when the hammers strike against the anvils the electrodes vibrate. The knocking shaft is connected with a drive via a rotary insulating coupling which includes an intermediate coupling member with drive bushes which are connected with engaging members provided on the end portions of the drive shaft and the knocking shaft. The above described electric precipitator, which is disclosed for example in the Walther brochure D 12/3135/0501, eliminates the high apparatus expenses of outwardly arranged insulators provided in the construction in accordance with DE-GM No. 1,935,026. The low apparatus expenses are obtained at the price of increased mechanical working of the metallic parts of the insulating coupling, increased wear at sliding locations of the connecting elements, and increased mounting expenses.

SUMMARY OF THE INVENTION

Accordingly, it is an object of the present invention to provide an electric precipitator which avoids the disadvantages of the prior art.

In keeping with these objects and with others which will become apparent hereinafter, one feature of the present invention resides in an electric precipitator having a plurality of collecting and spark electrodes arranged in a housing and provided with a knocking arrangement with engaging members which are connected to a driving shaft and a knocking shaft, and with an intermediate insulating coupling including drive bushes connected with the engaging members and an intermediate coupling member connecting the drive bushes with one another, wherein each of the drive bushes has an end portion facing toward the respective engaging member and having a polygonal receiving opening with rounded corners and concave connecting lines therebetween, and the upper surface of each of the engaging members has a shape corresponding to the shape of the receiving opening with a small amount of play and engages into the receiving opening.

When the electric precipitator is designed in accordance with the present invention, the conventional cardan connection between the ceramic insulating connecting member and the shaft ends to be connected with one another is replaced by a simple, almost mechanically unworked plug connection. The expenses for the inventive insulating coupling are many times lower than the expenses in the known arrangements. The especial advantage of the inventive arrangement resides in the fact that, despite the mechanically unworked inner and outer surfaces of the drive bushes and engaging members, the force-transmitting connection of the coupling parts in any position of both shafts to be connected, is provided. Neither an insignificant center displacement nor an axial longitudinal displacement of the shafts relative to one another influences the coupling action. Swinging motion of the shafts is absorbed by the coupling without difficulties.

The novel features which are considered characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
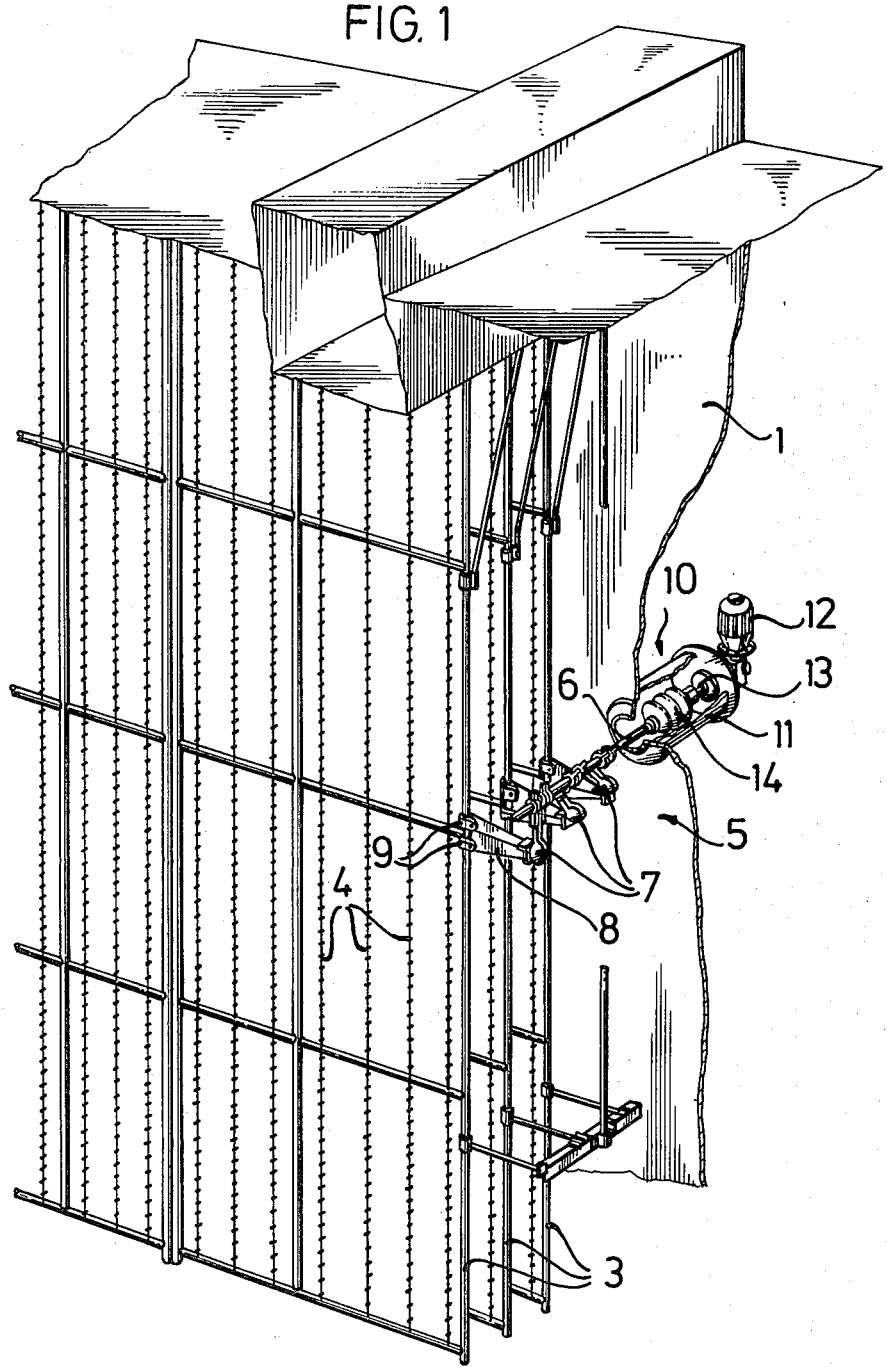
FIG. 1 is a schematic view showing an electric precipitator in accordance with the present invention.
Figure 2:
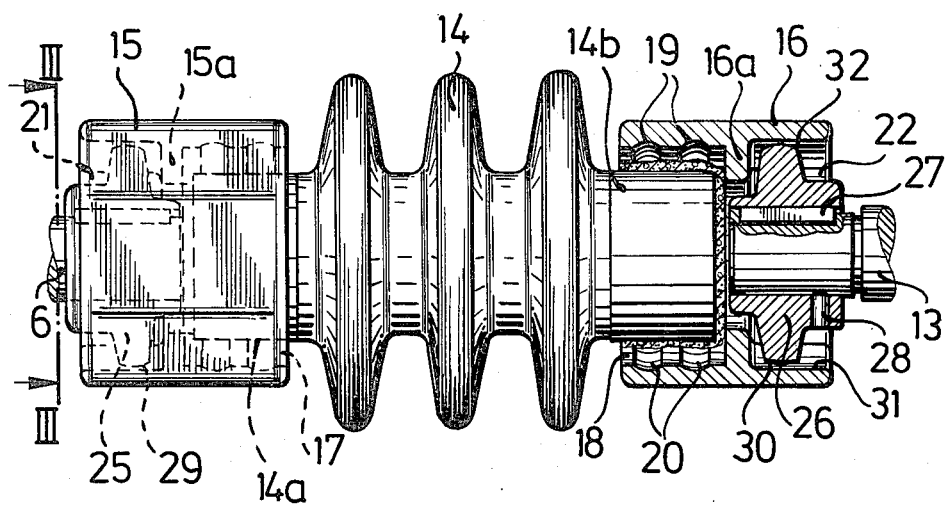
FIG. 2 is a view showing an insulating coupling in accordance with the invention, on an enlarged scale.
Figure 3:
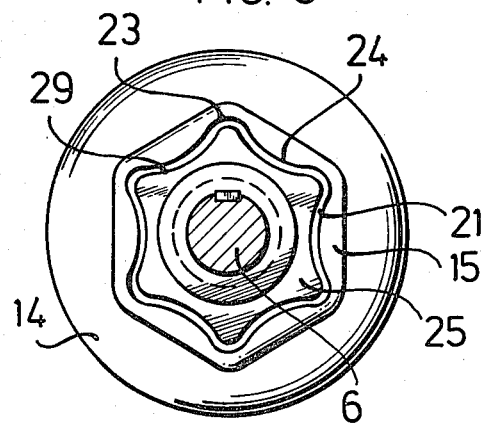
FIG. 3 is a view showing a section taken along the line A–B in FIG. 2.

An electric precipitator in accordance with the present invention has a housing identified by reference numeral 1 and a plurality of collecting or precipitating electrodes suspended in the housing at a distance from one another and not shown in the drawing. A plurality of spark or corona-discharge electrodes 4 are mounted on frames 3 in spaces formed between the collecting electrodes. The precipitator is provided with a knocking device for cleaning the spark electrodes 4 and/or collecting electrodes and identified in toto by reference numeral 5.

The knocking device 5 has a plurality of anvils 8 which are mounted with the aid of holders 9 on the frame 3 in the shown embodiment. A plurality of small hammers 7 are mounted on a rotary knocking shaft 6, each associated with a respective anvil 8. This shaft is driven in rotation and acts in such a manner that the hammer 7 moves upwardly and reaches a point from which it falls down under the action of its weight so as to strike against the anvil 8. Thereby vibrations act upon the frame and lead to cleaning of the electrodes.

The frame 3 with the spark electrodes 4 is under high voltage. The knocking shaft 8, the hammers 7, and the anvils 8 with the holders 9 are composed of metal and thereby form good conductors for the voltage. Because of this, insulation of at least the drive arrangement located outside of the housing 1 is necessary. The insulation includes an insulating coupling 10 which is located inside a housing 11. The insulation between the knocking shaft 6 and a driving shaft 13 of a drive motor 12 includes a ceramic insulating body 14 connected at both its sides with one of drive bushes 15 and 16.

Each of the drive bushes has a mounting opening 17 or 18, respectively, having a plurality of grooves. End portions 14a and 14b of the insulating body 14 are inserted in the mounting openings 17 and 18 and fixed in the same by a sealing or insulating material 20. This material can be composed of a fast-hardening concrete, or the like. The opposite end of the drive bushes 15 and 16 has recesses 21 and 22 limited by partitions 15a and 16a. The recesses 21 and 22 are polygonal. On molding and casting grounds, these recesses are hexagonal, inasmuch as this shape is the best for parting in the center. The recesses 21 and 22 have a plurality of corners 23 which are considerably rounded and connected with one another by concave lines 24.

Engaging members 25 and 26, which are also polygonal, for example hexagonal, and have rounded corners with concave connecting lines, engage in the recesses 21 and 22 of the drive bushes 25 and 26. The engaging members 25 and 26 are connected with the knocking shaft 6 and the driving shaft 13, respectively, by a threaded pin connection 28 and a key connection 27. The welded portions 29 and the concave portions 30 of the engaging members 25 and 26 are inserted in the recesses 21 and 26 of the drive bushes 15 and 16.

When inner surfaces 21 of the recesses 21 and 22 are straight, outer surfaces 32 of the portions 29 and 30 of the engaging members 25 and 26 are spherical. This provides for an especially favorable connection of both independent shafts 6 and 13. These surfaces can be formed vice versa, i.e. the inner surfaces 31 may be spherical whereas the outer surfaces 32 may be straight.

It will be understood that each of the elements described above, or two or more together, may also find a useful application in other types of constructions differing from the types described above.

While the invention has been illustrated and described as embodied in an electric precipitator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric precipitator, comprising a housing; a plurality of collecting electrodes arranged in said housing; a plurality of voltage-supplied spark electrodes arranged between said collecting electrodes in said housing; a knocking device for cleaning at least one group of said electrodes, said knocking device including a plurality of anvil members connected with said electrodes of said one group, and a plurality of hammer members arranged to strike against said anvil membersand mounted on a rotary knocking shaft; means for driving in rotation said knocking shaft of said knocking device and including a driving shaft; and means for connecting said driving shaft of said driving means with said knocking shaft of said knocking device, said connecting means including two engaging members each connected with a respective one of said shafts, and an insulating coupling extending through said housing and connecting said engaging members with one another, said insulating coupling including two drive bushes each connected with a respective one of said engaging members, and an intermediate coupling member connecting said drive bushes with one another, each of said drive bushes having a first end portion facing toward said intermediate cupling member and a second end portion facing toward a respective one of said engaging members, said second end portion of each of said drive bushes having a polygonal receiving opening with rounded corners and concave connecting lines between said rounded corners, and each of said engaging members having an outer surface having a shape corresponding to the shape of said receiving opening with a small play and engaging into said receiving opening.

2. An electric precipitator as defined in claim 1, wherein the electrodes of at least said one group are provided with holding means, said anvil members being arranged on said holding means.

3. An electric precipitator as defined in claim 1, wherein the receiving opening of each of said bushes has an inner surface cooperating with said outer surface of a respective one of said engaging members, one of said inner and outer surfaces being straight, whereas the other of said inner and outer surfaces is spherical.

4. An electric precipitator as defined in claim 1, wherein said receiving openings of said drive bushes and said outer surfaces of said engaging members have a hexagonal shape.

5. An electric precipitator as defined in claim 1; and further comprising means for fixing each of said engaging members on a respective one of said shafts.

6. An electric precipitator as defined in claim 5, wherein said fixing means includes first fixing means arranged for preventing axial displacement and second fixing means arranged for preventing rotation of each of said engaging members relative to a respective one of said shafts.

7. An electric precipitator as defined in claim 6, wherein said first fixing means for preventing axial displacement includes a threaded pin connection.

8. An electric precipitator as defined in claim 6, wherein said second fixing means for preventing rotation includes a key connection.

* * * * *